Patented Dec. 15, 1953

2,662,884

UNITED STATES PATENT OFFICE 2,662,884

METHOD OF BLEACHING CELLULOSE DERIVATIVES

Roy H. Jenkins, Jr., Hopewell, Va., assignor to Hercules Powder Company, Wilmington, Del., a corporation of Delaware No Drawing. Application May 17, 1951, Serial No. 226,930

15 Claims. (Cl. 260—232)

This invention relates to the treatment of cellulose derivatives. In a specific aspect this invention relates to a process for the treatment of cellulose ethers. In one of its specific aspects this invention relates to a process for the bleaching and removal of color bodies from a cellulose ether by a novel bleaching operation.

In the production of cellulose ethers, for example, carboxymethylcellulose, hydroxyethyl cellulose, and the like, it has been noted that color bodies are formed during such steps as the viscosity regulation by the use of viscosity reducing agents, such as hydrogen peroxide and manganese sulfate. The color bodies are not entirely removed by subsequent washing operations, and the color is noticeable in aqueous solutions of the cellulose ether. Cellulose ethers prepared from cotton linters are not subject to this color degradation to the same extent as cellulose ethers prepared from wood pulp. Consequently, this invention is particularly useful and adaptable to those cellulose ethers prepared from wood pulp, but the invention is also applicable to the cellulose ethers prepared from cotton linters. In view of the fact that the presence of color bodies in cellulose ethers is frequently undesirable, the importance of an efficient bleaching operation for removing such color bodies from the cellulose ether is quite evident.

It is an object of this invention to provide a novel process for the treatment of cellulose derivatives.

It is another object of this invention to provide a novel process for the treatment of cellulose ethers.

It is another object of this invention to provide a novel process for the bleaching and removal of color bodies from a cellulose ether.

It is a further object of this invention to provide a novel process for the bleaching and removal of color bodies from a cellulose ether, such as carboxymethylcellulose, carboxymethyl hydroxyethyl cellulose, and hydroxyethyl cellulose in a slurry with a nonsolvent for said ether.

Further and addition objects of this invention will be apparent from the detailed disclosure and description of the invention.

In accordance with this invention it has been found that cellulose ethers can be efficiently and effectively bleached and color bodies removed from the cellulose ether by contacting a slurry of the cellulose ether in an inert nonsolvent for the ether with a chlorite bleaching agent. When the slurrying medium is acidic, the chlorite is used alone as the bleaching agent. When a neutral or alkaline slurrying medium is employed, the chlorite is activated with a hypochlorite in order to effect the desired bleaching.

The following specific examples are illustrative of this invention.

Example 1

One hundred ten grams of carboxymethylcellulose wet with isopropanol (50 grams carboxymethylcellulose on a dry basis) was slurried in 1325 cc. 85% methanol at room temperature (4.1% slurry concentration), and 0.25 gram of a 25% aqueous sodium chlorite solution and 0.5 gram sodium hypochlorite solution (6% available chlorine) were added. The pH was adjusted to 6.5 to 7.5 with glacial acetic acid, and the slurry agitated for 0.5 hour. The carboxymethylcellulose was then filtered, batch washed with two 1500 cc. portions of 85% methanol, and dried in a forced air drier. The original carboxymethylcellulose had a 2% solution color of 3.5; the bleached carboxymethylcellulose had a solution color of 1.0.

Example 2

One hundred ten grams of carboxymethylcellulose wet with isopropanol (50 grams carboxymethylcellulose on a dry basis) was slurried in 1325 cc. 85% methanol at room temperature (4.1% slurry concentration), and 0.25 gram of a 25% aqueous sodium chlorite solution and 1.0 gram sodium hypochlorite solution (6% available chlorine) were added. The pH was adjusted to 6.5 to 7.5 with glacial acetic acid, and the slurry agitated for 0.25 hour. The carboxymethylcellulose was then filtered, batch washed with two 1500 cc. portions of 85% methanol, and dried in a forced air drier. The original carboxymethylcellulose had a 2% solution color of 3.5; the bleached carboxymethylcellulose had a solution color of 1.0.

Example 3

Two hundred twenty grams of carboxymethylcellulose wet with isopropanol (100 grams carboxymethylcellulose on a dry basis) was slurried in 780 cc. 95% methanol at room temperature (10.0% slurry concentration), and 0.5 gram of a 25% aqueous sodium chlorite solution and 1.0 gram sodium hypochlorite solution (6% available chlorine) were added. The pH was adjusted to 6.5 to 7.5 with glacial acetic acid, and the slurry agitated for 0.5 hour. The carboxymethylcellulose was then filtered, batch washed with two 1500 cc. portions of 85% methanol, and dried in a forced air drier. The original carboxymethylcellulose had a 2% solution color of 3.5; the bleached carboxymethylcellulose had a solution color of 1.5.

Example 4

One thousand seven hundred fifty grams of a carboxymethylcellulose slurry in 87% isopropanol (6.7% carboxymethylcellulose) was neutralized to a pH of 7.0 with phosphoric acid, and heated to 60° C. Then 2.2 grams of a 25% aqueous sodium chlorite solution and 4.2 grams of sodium hypochlorite solution (6% available chlorine) were added. The slurry was agitated 0.5 hour at 60° C. The carboxymethylcellulose was then filtered, washed once with 1500 cc. 100% methanol, and dried in a forced air drier. The original carboxymethylcellulose had a 2% solution color of 4.5; the bleached carboxymethylcellulose had a solution color of 1.5.

Example 5

Two hundred fifteen grams of carboxymethylcellulose wet with isopropanol (100 grams carboxymethylcellulose on a dry basis) was slurried in 1300 cc. 85% methanol at room temperature and 30 grams of a 10% aqueous sodium chlorite solution was added. The pH was adjusted to 4.0 with HCl, and the slurry agitated for 0.5 hour. The pH of the slurry was then adjusted to 8.0, and the carboxymethylcellulose filtered, batch washed with two 1500 cc. portions of 85% methanol, and dried in a forced air drier. The original carboxymethylcellulose had a 2% solution color of 3.5; the bleached carboxymethylcellulose had a 2% solution color of 1.0.

Example 6

Thirty grams dry carboxymethyl hydroxyethyl cellulose was slurried in 370 grams 87% isopropanol (7.5% slurry concentration), and 0.6 gram of a 25% aqueous sodium chlorite solution and 4.8 grams sodium hypochlorite solution (6% available chlorine) were added. The pH of the slurry was 7.7, so no additional pH adjustment was necessary. The slurry was agitated for 0.5 hour at room temperature. The carboxymethyl hydroxyethyl cellulose was then filtered, washed twice with two 1500 cc. portions of 100% methanol, and dried in a forced air drier. The original carboxymethyl hydroxyethyl cellulose had a 2% solution color of 6.0; the bleached carboxymethyl hydroxyethyl cellulose had a solution color of 1.0.

Example 7

One hundred fifty grams of dry hydroxyethyl cellulose was slurried in 1850 cc. of 87% isopropanol at room temperature (9% slurry concentration), and the pH adjusted to 6.8 to 7.0 with acetic acid. Three grams of a 25% aqueous sodium chlorite solution and 6.0 grams sodium hypochlorite solution (6% available chlorine) were added. The pH was raised to 8.4 by addition of the sodium hypochlorite, so pH was readjusted to 7.0 with acetic acid, and the slurry agitated for 0.5 hour. The hydroxyethyl cellulose was then filtered, batch washed with two 1500 cc. portions of 100% methanol and air dried in a forced air drier. The original hydroxyethyl cellulose had a solution color of 4.0 (2% hydroxyethyl cellulose in 5% sodium hydroxide); the bleached hydroxyethyl cellulose had a solution color of 2.0.

In the above examples the solution colors were determined by a method similar to that employed for nitrocellulose and ethyl cellulose solution color determinations, which method is described in ASTM Book of Standards, 1939, Designation D365-39, page 804. In this method, known as the platinum-cobalt color standard, 1.246 grams of potassium platinic chloride and 1.000 gram of cobalt chloride are dissolved in distilled water, and 100 cc. of concentrated hydrochloric acid is added. The solution is diluted to 1000 cc. with distilled water, and the resulting solution is a No. 10 color standard. Other color standards are prepared by adding distilled water to a portion of the No. 10 color standard. For example, a No. 1 color standard is prepared by mixing one volume of No. 10 color standard and nine volumes of distilled water. For a No. 2 color standard the volumetric proportions are 2:8; for a No. 3 color standard the volumetric proportions are 3:7. By comparison with these color standards the color determinations in the above examples were made.

The cellulose ethers within the scope of this invention are organic solvent-insoluble, and the ethers can be either alkalisoluble or water-soluble or soluble in both alkali and water. The degree of substitution, i. e., the number of substituent radicals per anhydroglucose unit, of the cellulose ethers will be such that the cellulose ether to be bleached has these properties. Actually, carboxymethylcellulose, carboxymethyl hydroxyethyl cellulose and hydroxyethyl cellulose are either alkali-soluble or water-soluble in all degrees of substitution. Among the cellulose ethers that can be bleached in accordance with this process are the alkyl cellulose ethers, for example, ethyl cellulose, propyl cellulose and butyl cellulose; hydroxyalkyl cellulose ethers, for example, hydroxyethyl cellulose; carboxyalkyl cellulose ethers, for example, carboxymethylcellulose, carboxyethy cellulose, carboxybutyl cellulose, and the like; carboxyalkyl hydroxyalkyl cellulose ethers, for example, carboxymethyl hydroxyethyl cellulose; and sulfoalkyl cellulose ethers, for example, sulfoethyl cellulose. In addition to the above cellulose ethers, ether-ester derivatives of cellulose can also be bleached in accordance with this process, but in these ether-ester derivatives the ether grouping is the dominant substituent. For example, it is within the scope of the invention to employ acetylated hydroxyethyl cellulose wherein the hydroxy ether grouping is the dominant substituent, and the acetyl radical is present only in a minor amount.

The cellulose ethers within the scope of this invention can be prepared by any of the known methods of preparation. Since the invention is particularly applicable in its preferred form to such cellulose ethers as carboxymethylcellulose and carboxymethyl hydroxyethyl cellulose, specific methods for preparing such cellulose ethers will be described. One of the preferred methods of preparing carboxymethyl hydroxyethyl cellulose is the slurry process wherein cellulose is reacted with an hydroxyalkylating agent such as ethylene oxide in the presence of a slurrying medium such as isopropanol and a caustic alkali, for example, sodium hydroxide. To the resulting reaction mixture is added a carboxyalkylating agent such as monochloracetic acid, and the resulting mixture is agitated for a period of time sufficient to effect the desired reaction. It is within the scope of the invention to bleach the carboxymethyl hydroxyethyl cellulose by addition of the bleaching agent to the resulting reaction mixture or, if desired, the cellulose ether can be recovered and bleached as described more fully hereinafter. Carboxyalkyl cellulose ethers, for example, carboxymethylcellulose, can be prepared by a similar slurry process which involves reacting cellulose in the presence of a caustic alkali with a carboxyalkylating agent such as monochloracetic acid in a slurry medium comprising a low boiling aliphatic alcohol, preferably isopropyl alcohol or tertiary butyl alcohol. The resulting mixture is agitated for a period of time sufficient to effect the desired reaction, and at the end of that time the resulting cellulose ether can be bleached in the reaction mixture by practicing this invention. Alternatively, the cellulose ether can be recovered from the reaction mixture and then bleached as described hereinafter. It will be understood by those skilled in the art that the above methods of preparing cellulose ethers are merely illustrative and that cellulose ethers prepared by these methods or any other method can be bleached by this process.

The slurrying media that are employed in practicing this invention are inert water-miscible organic liquids which are nonsolvents for the cellulose ether to be bleached. Typical examples of the slurrying media that can be employed are the lower alphatic alcohols, for example, methanol, ethyl alcohol, isopropyl alcohol, tertiary butyl alcohol, and the like. When the invention is employed to bleach cellulose ethers prepared by the slurry process, it is preferred to employ either isopropyl alcohol or tertiary butyl alcohol since those alcohols are preferred as the slurrying medium for the formation of the cellulose ether. Among the other organic liquids that can be used to slurry the cellulose ether are dioxane, tetrahydrofuran, the diethyl ether of ethylene glycol, and the like.

The bleaching agent that is employed in practicing this invention is a chlorite, preferably a metal chlorite, but nonmetallic chlorites, such as ammonium chlorite, can also be used. The preferred metal chlorites are the alkali metal and alkaline earth metal chlorites, for example, sodium chlorite, potassium chlorite, calcium chlorite, magnesium chlorite, and the like. Sodium chlorite is the preferred bleaching agent that is used in practicing this invention. The chlorite bleaching agent is usually added to the slurrying medium containing the cellulose ether in the form of an aqueous solution containing from 1 to 25% by weight of the chlorite. The amount of the chlorite required to effect the desired bleaching is variable. However, for all practical purposes, it has been found that the desired bleaching can be effected by employing from 0.125 to 3% by weight of the chlorite based on the cellulose ether to be bleached. It has also been found that the chlorite alone is effective for bleaching cellulose ethers only when the slurrying medium is substantially acidic, i. e., when the slurrying medium has a pH lower than 6. When the slurrying medium is neutral, i. e., when its pH is within the range of 6 to 8, or when the slurrying medium is alkaline and has a pH higher than 8, the chlorite alone does not effect the desired bleaching of the cellulose ether, and actually at a pH higher than 8 the bleaching action of the chlorite is rather slight. However, in a neutral or alkaline medium, the cellulose ether can be bleached with a chlorite bleaching agent by activating the chlorite with a hypochlorite. Various hypochlorites can be employed to effect the desired activation of the chlorite bleaching agent. The preferred hydrochlorites are the metal hypochlorites such as the alkali metal and alkaline earth metal hypochlorites, and the most preferred activating agent is sodium hypochlorite. The amount of hypochlorite that is required is variable, and generally from 0.5 to 4% by weight (based on the cellulose ether) of a hypochlorite solution containing about 6% available chlorine is effective. When using a chlorite activated with a hypochlorite to bleach a cellulose ether, it is preferred to effect the desired bleaching with a slurrying medium having a pH within the range of 6 to 8. Since the hypochlorite, for example, sodium hypochlorite, is unstable in a slurrying medium such as isopropyl alcohol and methyl alcohol, it is necessary to adjust the pH of the slurrying medium with an acid within not more than 15 minutes after the hypochlorite is introduced to the slurrying medium. If this procedure is not followed, most of the bleaching action will be lost. If desired, the pH of the slurrying medium can be adjusted before the chlorite and/or the hypochlorite is added, but in most instances a slight adjustment of the pH will be required after introduction of the hyprochlorite because of its alkalinity.

Hypochlorites, such as sodium hypochlorite, are not effective for bleaching these cellulose ethers. This fact was determined when the bleaching of carboxymethylcellulose was attempted with sodium hypochlorite, and it was found that the color improvement, if any, was negligible. In one run using 25% sodium hypochlorite (based on the carboxymethylcellulose) at a pH of 10.4 the color of the resulting carboxymethylcellulose was 4.0, and the color of the original carboxymethylcellulose was 3.5. In a similar run at a pH of 7.0 the color of the carboxymethylcellulose was unchanged from its original color of 3.5.

As indicated above, this invention is ideally suited for the bleaching of cellulose ethers prepared in accordance with the slurry process which has already been discussed. If desired, the bleaching operation can be effected by addition of the bleaching agent to the reaction mixture of slurrying medium and cellulose ether. On the other hand, the cellulose ether can be separated from the reaction mixture and, at a subsequent time, the ether is slurried in one of the organic slurrying media discussed above. The concentration of the slurry is generally within the range of 3 to 15 weight per cent. Higher concentrations are not desired since at such high concentrations efficient agitation of the slurry is difficult to obtain. Also lower concentrations acn be used, but since they are not necessary, they are not normally employed in order to avoid handling an unnecessarily large quantity of slurrying medium. After formation of the slurry of organic liquid and cellulose ether, the bleaching operation is effected by addition of either the chlorite or the chlorite-hypochlorite mixture.

It is one of the advantages of this invention that the bleaching of the cellulose ether can be effected over a wide temperature range. The bleaching process can be carried out at room temperature, and the preferred temperature range varies from 20° to 60° C. However, it will be understood that higher and lower temperatures can be used if desired, but higher temperatures are limited by the boiling point of the slurrying medium. In order to effect the desired bleaching the slurry containing the cellulose ether and bleaching agent is agitated with a mechanical mixer or by other suitable means for a period of time sufficient to carry out the desired bleaching.

Generally, the time required to effect the bleaching operation is within the range of 5 to 120 minutes. At the end of that period of time the bleached cellulose ether is separated from the slurry by suitable means such as filtration, centrifuging, decantation, and the like, and after drying the bleached cellulose ether is then ready for other processing or shipment.

In order that the pH of the slurrying medium can be maintained within the desired range, it is usually necessary to adjust the pH by addition of an acid to the slurry. Various organic and inorganic acids can be used to effect this pH adjustment. For example, acetic acid, has been found to be quite effective, and strong mineral acids, such as hydrochloric acid, and the like, are suitable for pH adjustment. Phosphoric acid can also be used for pH adjustment and, in some instances, it is preferred to employ phosphoric acid. It is well known that metal chlorites, such as sodium chlorite, are undesirably corrosive when in contact with metallic surfaces. However, when phosphoric acid is employed to adjust the pH, the phosphoric acid also inhibits the corrosive action of the sodium chlorite. Therefore, in those instances where an acid slurrying medium is employed and when the vessel in which the bleaching is effected is corrodible when in contact with a metal chlorite, it is preferred to adjust the pH of the slurrying medium with phosphoric acid.

This invention possesses numerous advantages over other bleaching operations. For example, the sodium chlorite is particularly adapted to the bleaching of water-soluble cellulose ethers made by the slurry process because the sodium chlorite is stable in the organic solvent slurrying medium. Also, the sodium chlorite does not tend to degrade the cellulose ether and thus cause an undesirable viscosity reduction of the ether. Further, the invention permits the bleaching of the cellulose ether in an acid, neutral or alkaline medium, and the bleaching can be carried out over a relatively wide temperature range, thus making unnecessary the use of any jacketed bleaching vessels. Also, regular types of stainless steel vessels can be employed to carry out the bleaching process since in a neutral or alkaline medium, the chlorite bleaching agent is not corrosive and in an acid medium its corrosive activity can be inhibited by proper selection of the acid for pH adjustment.

Numerous modifications and additional advantages of the process will be readily apparent to those skilled in the art.

What I claim and desire to protect by Letters Patent is:

1. The method of bleaching and removing color bodies from an organic solvent-insoluble cellulose ether which comprises contacting a slurry of said cellulose ether in an inert water-miscible nonsolvent for said cellulose ether with an inorganic chlorite, said chlorite being activated with an inorganic hypochlorite when the pH of said slurry is not lower than 6.

2. The method of bleaching and removing color bodies from an organic solvent-insoluble, water-soluble cellulose ether which comprises contacting a slurry of said cellulose ether in a water-miscible, lower aliphatic alcohol with an alkali metal chlorite activated with an alkali metal hypochlorite at a pH not lower than 6.

3. The method according to claim 2 wherein the cellulose ether is a water-soluble carboxymethylcellulose.

4. The method according to claim 2 wherein the cellulose ether is a water-soluble carboxymethyl hydroxyethyl cellulose.

5. The method according to claim 2 wherein the cellulose ether is hydroxyethyl cellulose.

6. The method of bleaching and removing color bodies from an organic solvent-insoluble, water-soluble cellulose ether which comprises forming a slurry containing from 3 to 15% by weight of said cellulose ether in a water-miscible, lower aliphatic alcohol, adding to the slurry thus formed from 0.125 to 3% by weight of sodium chlorite based on the celluluose ether and from 0.5 to 4% by weight of sodium hypochlorite based on the celluluose ether, adjusting the pH of the resulting mixture to a pH within the range of 6 to 8, and agitating the mixture thus formed for a period of 5 to 120 minutes at a temperature within the range of 20° to 60° C.

7. The method according to claim 6 wherein the alcohol is isopropanol.

8. The method according to claim 6 wherein the alcohol is methanol.

9. The method of bleaching and removing color bodies from an organic solvent-insoluble, water-soluble cellulose ether which comprises contacting a slurry of said cellulose ether in a water-miscible, lower aliphatic alcohol with an alkali metal chlorite at a pH lower than 6.

10. The method according to claim 9 wherein the cellulose ether is a water-soluble carboxymethylcellulose.

11. The method according to claim 9 wherein the cellulose ether is a water-soluble carboxymethyl hydroxyethyl cellulose.

12. The method according to claim 10 wherein the cellulose ether is hydroxyethyl cellulose.

13. The method of bleaching and removing color bodies from an organic solvent-insoluble, water-soluble cellulose ether which comprises forming a slurry containing from 3 to 15% by weight of said cellulose ether in a water-miscible, lower aliphatic alcohol, adding to the slurry thus formed from 0.125 to 3% by weight of sodium chlorite based on the cellulose ether, adjusting the pH of the resulting mixture to a pH lower than 6, and agitating the mixture thus formed for a period of 5 to 120 minutes at a temperature within the range of 20° to 60° C.

14. The method according to claim 13 wherein the alcohol is isopropanol.

15. The method according to claim 13 wherein the alcohol is methanol.

ROY H. JENKINS, Jr.

References Cited in the file of this patent

UNITED STATES PATENTS

| Number | Name | Date |
| --- | --- | --- |
| 1,948,517 | Dreyfus | Feb. 27, 1934 |
| 2,109,509 | Schneider | Mar. 1, 1938 |
| 2,138,757 | Collings et al. | Nov. 29, 1938 |
| 2,238,192 | McHard | Apr. 22, 1941 |
| 2,358,866 | MacMahon | Sept. 26, 1944 |

FOREIGN PATENTS

| Number | Country | Date |
| --- | --- | --- |
| 561,834 | Great Britain | June 7, 1944 |

OTHER REFERENCES

Taylor et al.: "Technical Ass'n Papers," 1940, pages 251–254.